United States Patent [19]

Sasaki et al.

[11] 4,015,187

[45] Mar. 29, 1977

[54] EXCITER ARRANGEMENT FOR GENERATORS

[75] Inventors: Akio Sasaki; Kiyoteru Kuwabara; Hisakatsu Kiwaki, all of Katsuta, Japan

[73] Assignee: Hitachi, Ltd., Japan

[22] Filed: Oct. 4, 1974

[21] Appl. No.: 512,156

[30] Foreign Application Priority Data

Oct. 8, 1973   Japan .................... 48-112353

[52] U.S. Cl. .................... 322/14; 322/29; 322/31; 322/59; 290/40 C

[51] Int. Cl.² .................... H02P 9/04

[58] Field of Search ............... 322/15–19, 322/25, 27, 29, 31, 32, 59, 14; 320/30; 290/40 A, 40 C

[56] References Cited

UNITED STATES PATENTS

| | | | |
|---|---|---|---|
| 2,368,456 | 1/1945 | Edwards | 322/31 X |
| 2,598,124 | 5/1952 | Holt et al. | 290/40 C |
| 3,012,185 | 12/1961 | Johnson | 322/32 |
| 3,370,218 | 2/1968 | Merz | 322/15 |
| 3,483,463 | 12/1969 | Smith | 322/29 |
| 3,619,763 | 11/1971 | Wyles | 322/32 |
| 3,683,268 | 8/1972 | Obata | 322/28 X |
| 3,854,617 | 9/1958 | Johnson | 322/32 |

Primary Examiner—Robert J. Hickey
Attorney, Agent, or Firm—Craig & Antonelli

[57] ABSTRACT

There is provided an exciter arrangement for generators comprising an internal combustion engine, a generator coupled with the internal combustion engine and driven thereby, an exciter for regulating excitation of the exciter, a detector for detecting a value responsive to a revolution number of the internal combustion engine, and a controller for controlling the exciter in response to an output of the detector.

18 Claims, 15 Drawing Figures

EXCITER ARRANGEMENT FOR GENERATORS

The present invention relates to an exciter arrangement for generators, especially for a generator coupled with an internal combustion engine and driven thereby.

In an electric locomotive, for example, wherein a mechanical power of an internal combustion engine is converted by means of a generator into an electrical power which in turn is converted by means of a motor into a mechanical power, a revolution number command and an exciting current command are delivered stepwise through a main controller to the internal combustion engine and the generator, respectively, through respective positions of notched contacts of the main controller. In order to assure a smooth operation of the electric locomotive, the revolution number of internal combustion engine and the exciting current for generator are needed to be controlled in a substantially linear relation to the position of the notched contacts.

A comparison of the controlling response of the internal combustion engine with that of the generator shows that the internal combustion engine takes a time delay of about 10 to 60 seconds to reach a rating state from an idling state whereas time delay due to regulation of the exciting current for the generator, including time delay caused in an exciter for regulating the exciting current for the generator, amounts to 0.5 to 1 second at most.

For this reason, when the position of the notched contacts is changed, the exciting current for generator has a response preferential to that of the output of internal combustion engine with the result that the output imposed to the internal combustion engine overshoots to so a great extent that the internal combustion engine assumes an excessive load at the ultimate position of the rating notched contact, thereby preventing a smooth control of the operation.

In addition, upon a rapid variation in load imposed to the generator (for example, in case where the excitation for generator is weakened for controlling the speed of motor in higher speed range), the load of internal combustion engine is transiently increased, giving rise to decrease in the revolution number of the engine. Reduction in the revolution number depends on the inertia of internal combustion engine. Once the revolution number is redcued, it takes a long time to recover the revolution number, as described above. Thus, a great difference between controlling response of the internal combustion engine and that of the generator prevents a smooth controlling of the operation.

An object of the present invention is to provide an exciter arrangement for generators capable of assuring a smooth controlling of the operation even when the internal combustion engine has a different controlling response from that of the generator.

Another object of the present invention is to provide an exciter arrangement which can operate stably even when a transient variation in load is caused during it stationary operation.

According to the present invention, an exciter arrangement for generators comprising an internal combustion engine, a generator coupled with the internal combustion engine and driven thereby, an exciter for regulating an exciting current for said generator, a detecting circuit for detecting a value responsive to a revolution number of said internal combustion engine, a commanding circuit for producing a command to said exciting current as a function of the output of said detecting circuit, and a controlling circuit for controlling said exciter in response to an output of said commanding circuit.

Other objects and features of the invention will become apparent from following detailed description taken in conjunction with the accompanying drawings in which:

FIG. 1 shows a prior art exciter arrangement and FIGS. 2 to 4 characteristics thereof.

Figure 1:
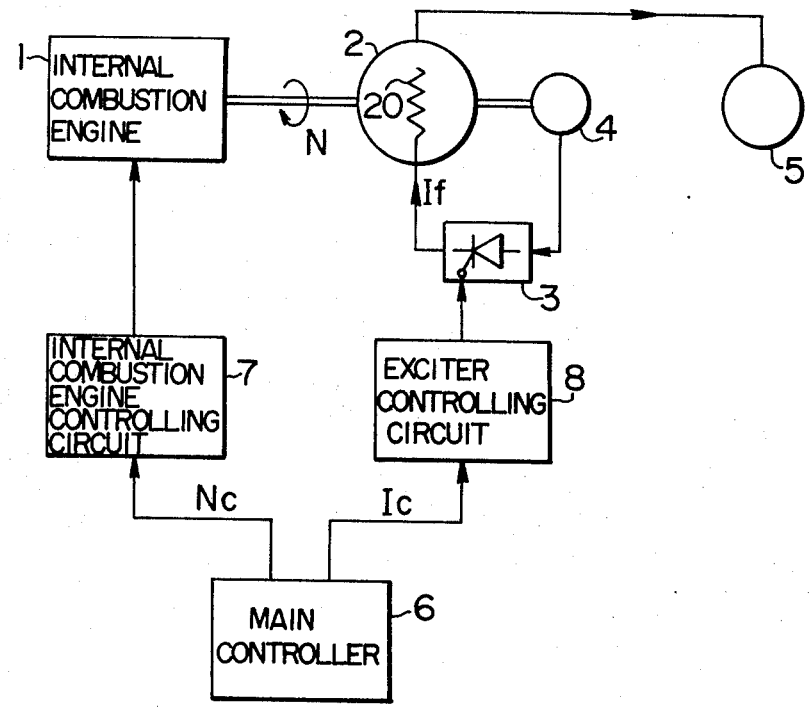
FIG. 1 shows a block diagram of a prior art exciter arrangement.

In FIG. 1, numeral 1 designates an internal combustion engine, 2 a generator coupled with the internal combustion engine 1 for converting a mechanical power produced therein into an electrical power. Numeral 3 designates an exciter constituted by thyristors and adapted to regulate through phase controlling an exciting current if to be applied to a field winding 20 of generator 2. The exciter 3 is constituted for its purpose by various well-known circuits such as a thyristor bridge circuit, a complex bridge circuit of thyristors and diodes, a chopper circuit or the like. Numberal 4 designates an auxiliary generator coupled with the internal combustion engine 1, just as generator 2 coupled therewith, for generating an electrical power to be applied to the input of exciter 3. Numeral 5 designates a load for converting an electrical power produced in the generator 2 into a mechanical power. In this instance, the load 5 comprises a group of motors which is constituted by a plurality of motors. Numeral 6 designates a main controller for producing a revolution-number command $N_c$ for internal combustion engine 1 and an exciting-current command $I_c$ for generator 2. Numeral 7 represents an internal combustion engine controlling circuit which receives a revolution-number command $N_c$ from the main controller 6 to control the revolution number of internal combustion engine 1. Numeral 8 represents an exciter controlling circuit which receives an exciting-current command $I_c$ from the main controller 6 to control the ignition phase of thyristors of exciter 3.

Main controller 6 with notched contacts transmits a revolution-number $N_c$ and an exciting current command $I_c$ which are varied stepwise in accordance with the position of notched contacts.

Figure 2:
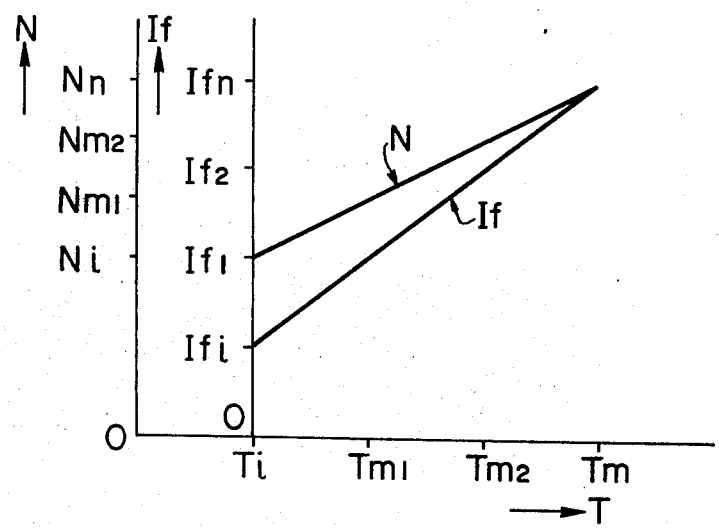
FIG. 2 shows a graph to explain a controlling characteristic of the prior art exciter arrangement shown in FIG. 1.

With the construction as shown in FIG. 1, the revolution number N of internal combustion engine 1 and the amount of exciting current $I_f$ are usually needed to be set, by selecting the position of the notched contacts of main controller 6, for the purpose of assuring a smooth operation in such a manner that the output of internal combustion engine and the starting current of motors which constitute load 5 can be controlled in a substantially linear relation. To attain this end, as shown in FIG. 2, the revolution number N of internal combustion engine 1 will be set in accordance with notched contacts Ti through Tn equally dividing a range between an idling revolution number Ni and a rating revolution number Nn. Exciting current $I_f$ for the generator will also be set substantially linearly in relation to the positions of notched contacts.

Figure 3:
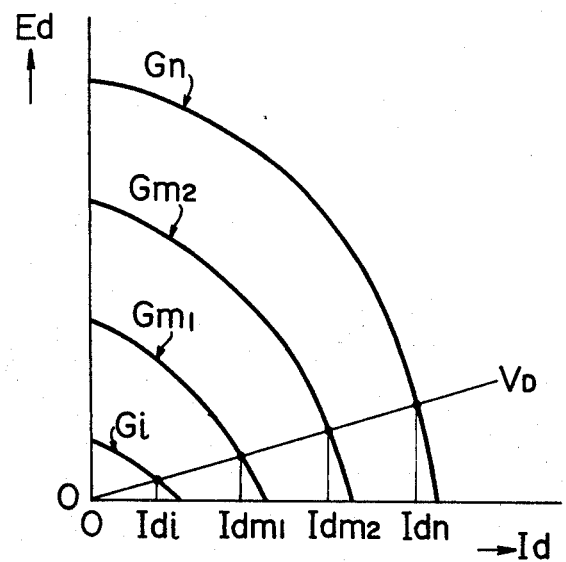
FIG. 3 shows a graph to explain output characteristics of generator of the prior art exciter arrangement shown in FIG. 1.

Under these conditions, generator 2 bears output characteristics as shown in FIG. 3. In FIG. 3, abscissa $I_d$ represents the output current of generator 2 while ordinate $E_d$ the output voltage of the same, where suffix symbols i, m, n are representative of idling, intermediate and rating states, respectively. A straight line $V_D$ represents a load line or internal resistance line of motor group 5, i.e. a dynamic line of generator 2 when the speed of motor group 5 is zero.

Figure 4:
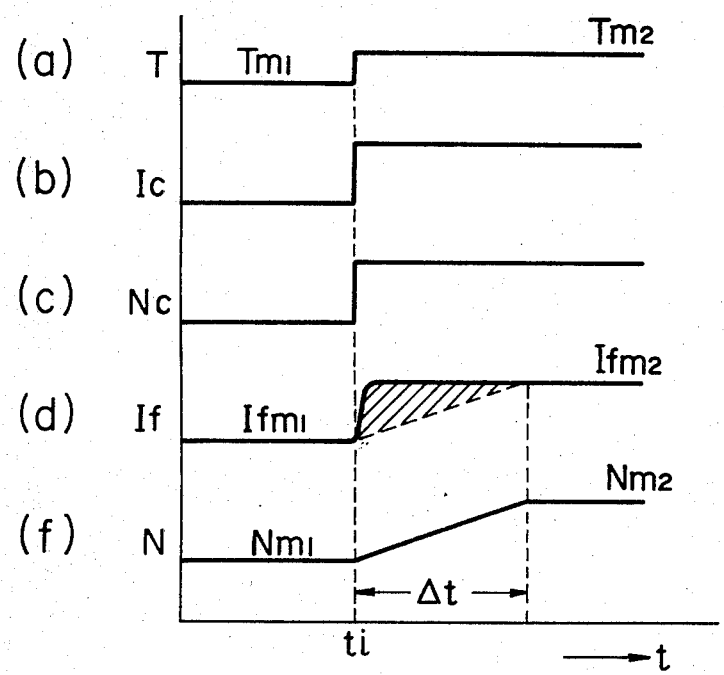
FIG. 4 shows a diagramatic representation to explain transient characteristics of the prior art exciter arrangement.

The prior art arrangement described above has disadvantages which will be described hereunder with reference to FIG. 4. In FIG. 4, (a) represents variation in the position of notched contacts T (for example represented by angular position) with respect to time lapse, the notched contact being changed from $T_{m1}$ to $T_{m2}$ at time ti; (b) represents variation in exciting-current command $I_c$, the exciting-current command varying stepwise at time ti where the notched contact T is changed; (c) represents variation in revolution number command $N_c$, which revolution number command varies stepwise at time ti as exciting-current command $I_c$ does; (d) represenets variation in exciting-current $I_f$ of generator 2; and (e) represents variation in revolution number N of internal combustion engine 1.

Internal combustion engine 1 usually takes about 10 to 60 seconds time delay to reach the rating revolution from the idling revolution whereas the time delay of field excitation for generator 2 amounts to 0.5 to 1 second which includes time delay caused in exciter 3. Therefore, as shown in FIG. 4, during time $\Delta t$ which has been elapsed before the revolution number N reaches a predetermined value in subsequent to the rise of exciting current $I_f$ nearly at time ti where the notched contact is changed from $T_{m1}$ to $T_{m2}$, the output imposed to the internal combustion engine overshoots to so a great extent that the internal combustion engine assumes an excessive load at the ultimate rating notched contact, with the result that a smooth controlling is prevented.

In addition where for controlling a rapid variation in load of generator 2, for example for controlling the speed of the motor group 5 in higher speed range, the field excitation is weakened, a transient increase in load of internal combustion engine 1 is caused, giving rise to an impulsion to the internal combustion engine and a decrease in the revolution number. The reduction in revolution number usually continues for 0.5 to 1 second depending on the inertia of both the internal combustion engine 1 and generator 2, and the revolution number once decreased will take an extremely long time to recover, as described above. Thus, a smooth operation is prevented.

Where internal combustion engine 1 has not reached a predetermined revolution number under the command of main controller 6, for example in case where a governor for controlling the speed of the internal combustion engine 1 is out of order, the same amount of exciting current as that for normal operation is supplied to generator 2 and accordingly, internal combustion engine 1 assumes an excessive load as compared to the output which the internal combustion engine 3 delivers with the normal revolution number.

Figure 5:
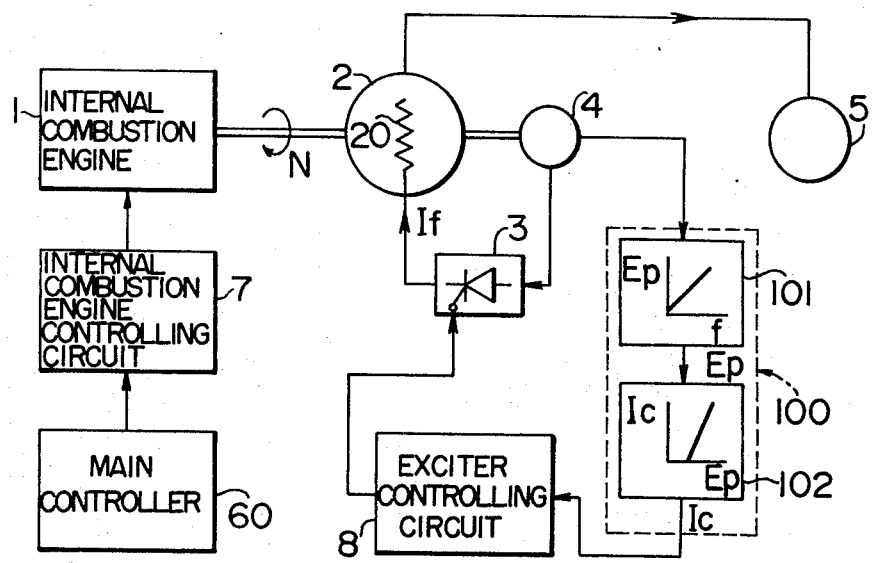
FIG. 5 shows a block diagram of an exciter arrangement embodying the invention.

FIG. 5 shows a block diagram of an exciter arrangement for generators embodying the present invention achieved to obviate the prior art drawbacks, wherein the same numerals are designated to like parts shown in FIG. 1.

FIG. 5 differs from FIG. 1 in that exciting-current command $I_c$ delivered from main controller 6 to respective notched contacts is instead derived from an actual revolution number of internal combustion engine 1.

The exciter arrangement shown in FIG. 5 comprises an internal combustion engine 1, a generator 2, an exciter 3, an auxiliary generator 4, a motor group 5 as a load, a main controller 60, an internal combustion engine controlling circuit 7, an exciter controlling circuit 8, an exciting current commanding circuit 100 which comprises a frequency to voltage converter 101 and a function generator 102.

Where DC motors are used as load 5, it is practical to use a DC generator as generator 2; but where an AC generator is used as generator 2, it is advisable to convert an output power of AC generator into a DC power through a rectifier circuit and then to supply the DC power thus obtained to DC motors used as load 5.

Auxiliary generator 4 delivers an AC output voltage the amplitude of which is constant irrespective of its revolution number and the frequency of which is proportional to its revolution number.

Similar to FIG. 1, revolution number command $N_c$ from main controller 60 is varied in accordance with the positions of the notched contacts.

Figure 6A:
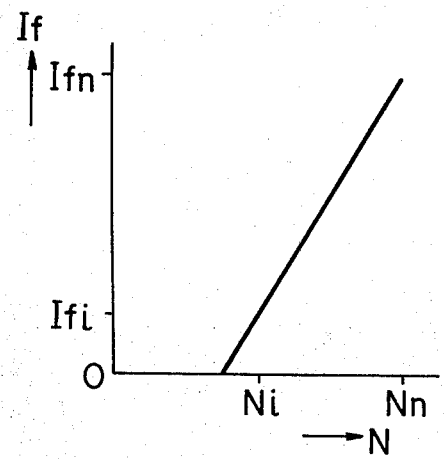
FIGS. 6a and 6b show graphs to explain controlling characteristics of the embodiment shown in FIG. 5.
Figure 6B:
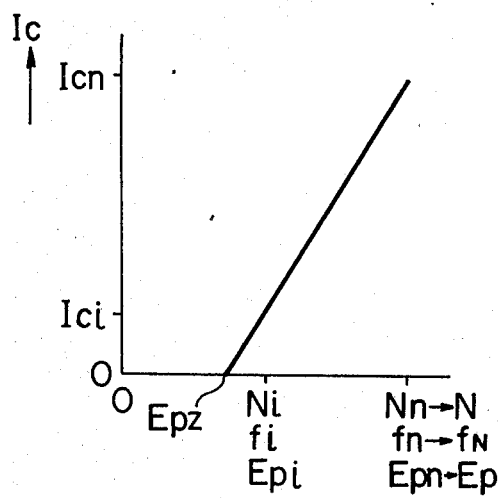

Referring now to FIGS. 6a and 6b, the operation performed with this construction will be described. As seen from FIG. 2, the exciting current $I_f$ for generator 2 varies as a function of the revolution number N of internal combustion engine 1 and has characteristics as shown in FIG. 6a. On the other hand, since the exciting current $I_f$ for generator 2 is proportional to the exciting current command $I_c$, a desired amount of exciting current $I_f$ can be obtained when the exciting current command $I_c$ is regulated in exciting current commanding circuit 100 to have similar characteristics to FIG. 6a, as shown in FIG. 6b, with respect to the revolution number of internal combustion engine.

According to the embodiment shown in FIG. 5, in view of the fact that an output frequency of the auxiliary generator 4 is proportional to the revolution number N of the internal combustion engine 1 as mentioned above, the output of auxiliary generator 4 is utilized as element of revolution number N. More particularly, a voltage $E_p$ proportional to an output frequency $f$ of the auxiliary generator 4 is obtained in frequency to voltage converter 101 of exciting current commanding circuit 100. The voltage $E_p$ is then converted in function generator 102 in such a manner that the exciting current command $I_c$ has characteristics as shown in FIG. 6b.

Figure 7:
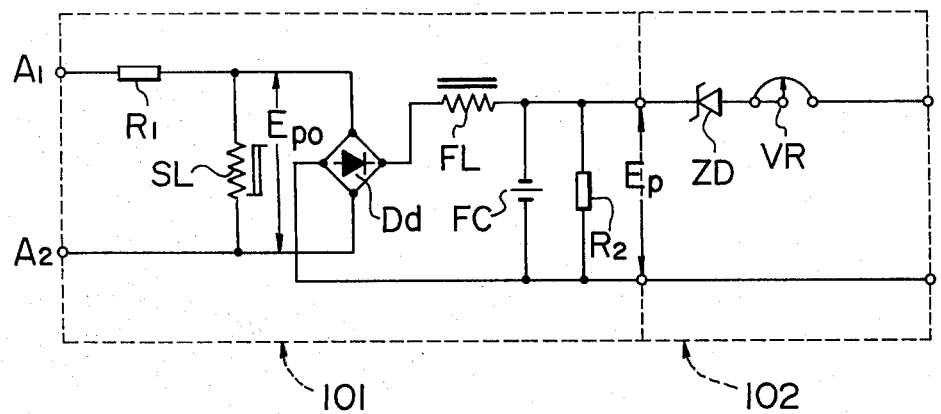
FIG. 7 shows a partial circuit diagram of the embodiment shown in FIG. 5.

FIG. 7 is a circuit diagram of exciting current commanding circuit 100 of FIG. 5. As shown in FIG. 7, frequency to voltage converter 101 comprises an input current limiting resistor R1, a saturable reactor SL, a single-phase full wave rectifier circuit Dd, a smoothing reactor FL, a smoothing capacitor Fc, and an output resistor R2. Between input terminals A1 and A2 of the frequency to voltage converter 101 is applied an output voltage of auxiliary generator 4. Saturable reactor SL is a principal component of this converter 101 and it operates under the application of a voltage beyond its critical value. Accordingly, at the commencement of AC half cycle, it operates in its non-saturable region and has a high impedance, thereby to permit the output voltage of auxiliary generator 4 to be applied between AC terminals of rectifier circuit Dd. As a product of applied voltage and time lapse or a voltage-time product reaches a critical value inherent to saturable reactor SL, the saturable reactor SL becomes saturated until it has a practically negligible low impedance. As a result, the voltage applied between the AC terminals of rectifier circuit Dd has been nullified before next half cycle of inverting polarity commences. At that time, an entirety of input voltage is applied across the resistor R1 adapted to limit a current flow while the saturable reactor becomes saturated. In other words, the saturable reactor SL acts, by its own switching function, to calculate at every other half cycle a predetermined quantity of the voltage-time product confined in a half cycle, and to deliver the product to rectifier circuit Dd.

Since the voltage across the AC terminal of rectifier circuit Dd is always the same as that across saturable reactor SL, a relation between an average voltage $E_{po}$ (volt), which is identical to an average of voltage-time product absorbed by saturable reactor SL during non-saturation period, and a frequency $f$ (Hertz) is related to an average voltage across rectifier circuit Dd. Where magnetic flux and the number of winding of saturable reactor SL are represented by $\phi$(Weber) and N (turn), respectively, $$E_{po} = 4 \cdot \phi \cdot N \cdot f \text{ (Volt)}$$

stands. Since magnetic flux $\phi$ and the number of winding $N$ are constant, average voltage $E_{po}$ proportional to frequency $f$.

When the voltage $E_{po}$ is subjected to a full-wave rectification in the rectifier circuit Dd and smoothed through smoothing reactor FL and smoothing capacitor FC, a DC voltage Ep proportional to an input frequency $f$ is obtained across output resistor R2.

Function generator 102 comprises a zener diode ZD and a variable resistor VR.

When a zener voltage of zener diode ZD is selected as shown at $E_{pz}$ in FIG. 6b, exciting current command $I_c$ is zero between zero of conversion voltage $E_p$ and $E_{pz}$ thereof, and the conversion voltage $E_p$ beyond $E_{pz}$ permits exciting current command $I_c$ to flow. The inclination of the characteristic curve can be adjusted by means of variable resistor VR.

That is to say, by selecting the zener voltage $E_{pz}$ of zener diode ZD and resistance of variable resistor VR, desired characteristics as shown in FIG. 6 can be obtained.

Figure 8:
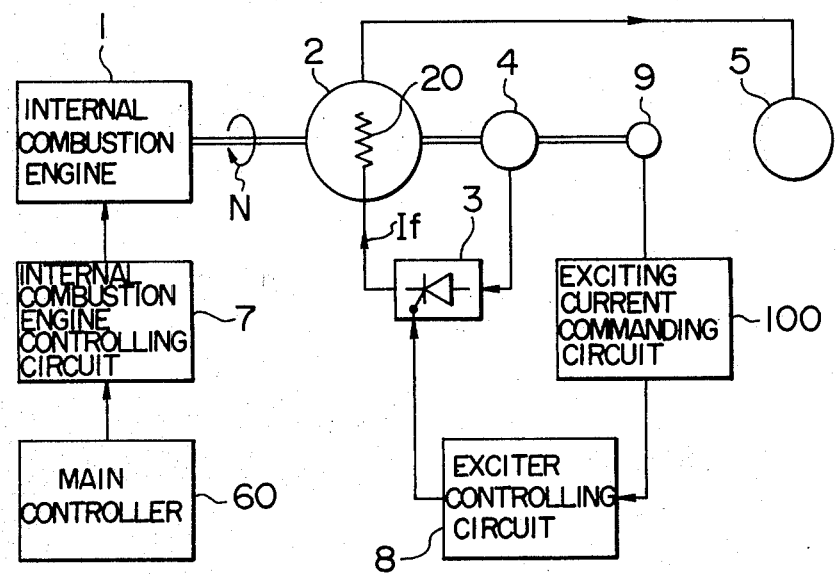
FIGS. 8 to 11 show block diagrams of further embodiments of the invention.

In the embodiment shown in FIG. 5, the output of auxiliary generator 4 is applied through the exciter 3 to the generator 2 to excite it and is also used as an element for detecting the revolution number of internal combustion engine 1; otherwise, as shown in FIG. 8, the output of auxiliary generator 4 may be used only for exciting the generator 2 and a speed generator 9 directly connected to internal combustion engine 1 may be used as element for detecting the revolution number of internal combustion engine 1, which speed generator is usually used for controlling the speed of motor since it produces a DC voltage proportional to the revolution speed.

In this case, the frequency to voltage converter 101 of the exciting current commanding circuit 100 shown in FIG. 5 can be omitted and the output of speed generator 9 is applied to the input of the function generator 102.

Of course, a digital detector producing a train of pulses proportional to the revolution number of the internal combustion engine 1 may be used instead of speed generator 9.

Figure 9:
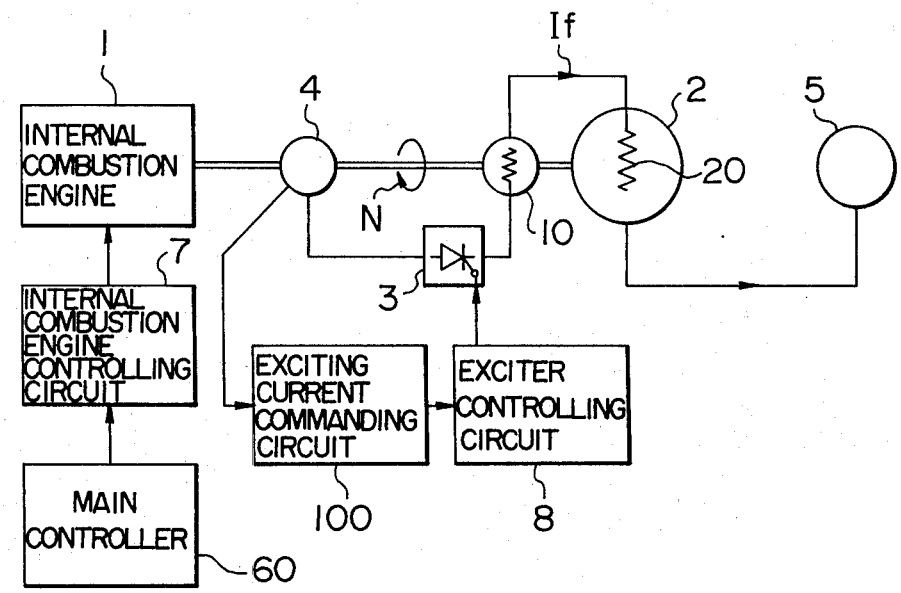

A further embodiment of the invention is shown in FIG. 9. In this embodiment, a rotary exciter 10 is used as an exciting source and is coupled directly with generator 2. An output current of the rotary exciter 10 is applied for exciting the field winding 20 of the generator 2. The exciting current for the rotary exciter 10 is delivered from the exciter 3.

Figure 12A:
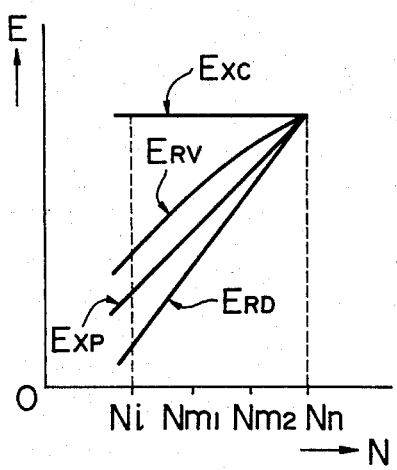
FIGS. 12a, 12b and 12c show graphs to explain the operation of the further embodiments.
Figure 12B:
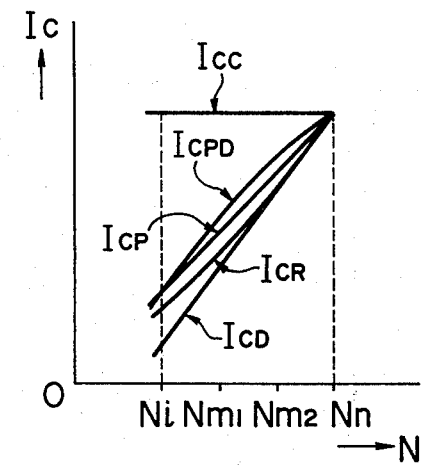
Figure 12C:
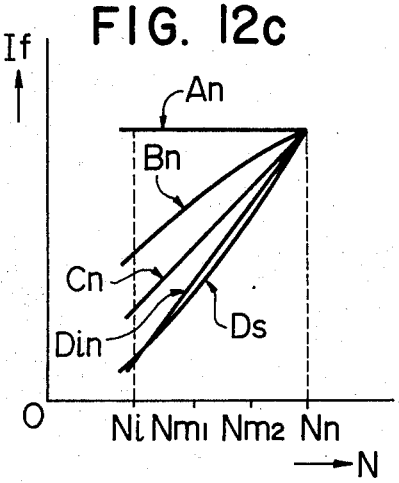

With reference to FIGS. 12a to FIGS. 12c, the operation of the embodiment shown in FIG. 9 will be described. FIG. 12a shows a relation between the revolution number N of internal combustion engine 1 and the output voltage E of auxiliary generator 4 (or of rotary exciter 10), FIG. 12b a relation between the revolution number N of internal combustion engine 1 and the exciting current command $I_c$ of exciting current commanding circuit 100, FIG. 12c a relation between the revolution number N of internal combustion engine 1 and the exciting current $I_f$, in which a curve Din represents desired exciting current characteristics.

In FIG. 9, output voltage E of auxiliary generator 4 is constant as described above, and therefore it is represented by curve Exc in FIG. 12a. If the exciting current command $I_c$ of exciting current commanding circuit 100 is fixed as shown at curve $I_{cc}$ in FIG. 12b, the exciting current for rotary exciter 10 becomes constant and therefore the output voltage E of rotary exciter 10 can be shown at curve $E_{RV}$ in FIG. 12a. Since the output voltage of rotary exciter 10 has a proportional relation to the exciting current of generator 2, with curve $E_{RV}$ in FIG. 12a the exciting current $I_f$ of generator 2 is shown at curve Bn in FIG. 12c. With curve Bn, it is quite impossible to obtain desired characteristics. To obtain desired characteristics Din, as shown in FIG. 12a, it is necessary for the output voltage of rotary exciter 10 to have characteristics represented by curve $E_{RD}$ proportional to curve Din shown in FIG. 12c. On the other hand, the exciting current of rotary exciter 10 has a proportional relation to the exciting current command $I_c$ of exciting current commanding circuit 100.

Accordingly, in order to match the output voltage E of rotary exciter 10 with curve $E_{RD}$ in FIG. 12a, the exciting current command $I_c$ of exciting current commanding circuit 100 is required to set to curve $I_{CR}$ in FIG. 12b.

In this case, exciting current commanding circuit 100 can be constructed by the circuit shown in FIG. 7. This is because the frequency to voltage converter 101 has the input-output characteristic as shown at curve $I_{cp}$ in FIG. 12b. By altering set values of zener diode ZD and variable resistor VR or by connecting additional zener diode and variable resistor in parallel to the diode ZD and resistor VR in the function generator 102 as shown in FIG. 7, curve $I_{CR}$ can be derived form curve $I_{cp}$ of FIG. 12b.

Figure 10:
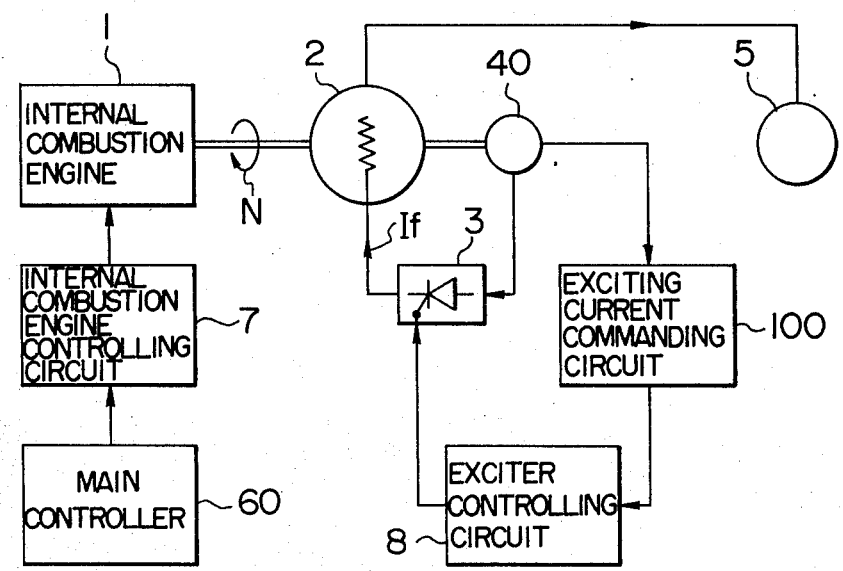
Figure 11:
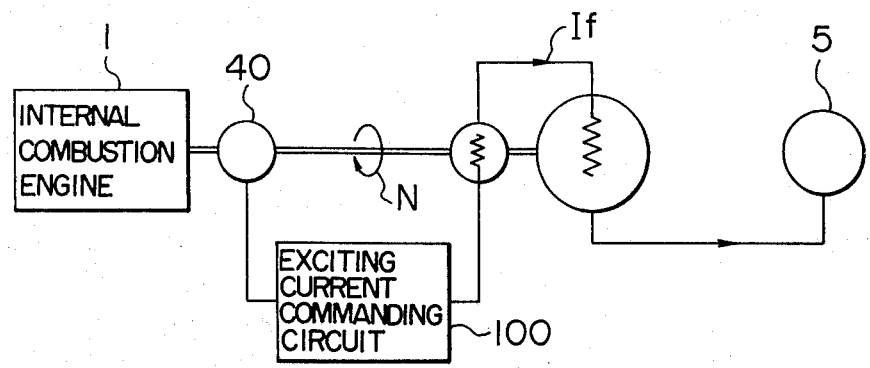

It is noted that in the embodiments shown in FIGS. 5, 8 and 9 the output voltage of auxiliary generator 4 was constant. In the following description the output voltage of the auxiliary generator is proportional to the revolution number N of internal combustion engine 1 as shown at curve $E_{xp}$ in FIG. 12a. FIGS. 10 and 11 show further embodiments similar to the embodiment of FIG. 5. Instead of auxiliary generator 4, such an auxiliary generator that has an output proportional to the revolution number is used in FIG. 10 and the rotary exciter 10, a in FIG. 9, is used in FIG. 11.

With reference to FIG. 12, the operation of the embodiment of FIG. 10 will be described. The output voltage E of auxiliary generator 40 assumes characteristic represented by curve $E_{xp}$ in FIG. 12a. Where the exciting current command $I_c$ of exciting current commanding circuit 100 is constant as shown at curve $I_{cc}$ in FIG. 12b, the exciting current $I_f$ for generator 2 is of course proportioned to the revolution number as shown at curve Cn in FIG. 12c.

Accordingly, in order to obtain a desired curve Din of FIG. 12c, the exciting current command $I_c$ is needed to have such a characteristic that is proportional to the revolution number N as shown at curve $I_{cp}$ in FIG. 12b. The output voltage of exciter 3 has a square proportional relation to the revolution number and the exciting current $I_f$ for generator 2 has square curve characteristics as shown at curve Ds in FIG. 2c. The curve Ds approximates to the desired curve Din and it satisfies practical precision. To obtain the desired curve Din more precisely, as shown in FIG. 12b, curve $I_{cpD}$ approximate to curve $I_{cp}$ may be produced in the function generator of exciting current commanding circuit 100.

For exciting current commanding circuit 100 of FIG. 10, the frequency to voltage converter 101 can be omitted from the circuit of FIG. 7. Further, to obtain curve $I_{cpD}$, function generator 102 may be altered suitably.

Next, with reference to FIG. 11, the embodiment with rotary exciter 10 will be described. Since the output voltage E of auxiliary generator 40 is proportional to the revolution number N as shown at curve $E_{xp}$ in FIG. 12a, by applying an input representative of curve $E_{xp}$ to exciting current commanding circuit 100 and only by shaping the input to curve $I_{CR}$ shown in FIG. 12b through the function generator, the exciting current $I_f$ for generator 2 can be obtained as shown at curve Din in FIG. 12c. Accordingly, exciter 3 of FIG. 9 is no more required.

As has been described, in accordance with the present invention, the exciting current $I_f$ for the generator is regulated by the exciting current command $I_c$ as a function of the revolution number of the internal combustion engine. Thus, the following advantages are brought about.

Upon transfer of the notched contact of main controller 6 to higher one, since the exciting current command $I_c$ and exciting current $I_f$ for generator gradually increase over excitation and over loading can be prevented during transient period due to the transfer.

Conventionally, even when the notched contact was fixed, a temporary over loading due to field controlling of loaded motor often caused reduction in the revolution number N of the internal combustion engine. According to the invention, however, as the revolution number decreases, the exciting current command $I_c$ immediately follows to decrease. For this reason, the over loading can be eased markedly, giving rise to minimizing the reduction in the revolution number of the internal combustion engine and fluctuations during the transient period.

Furthermore, in the event that the governor for the internal combustion engine gets out of order and a difference is caused between the revolution number command of main controller 6 and an actual revolution number N of the internal combustion engine, a proper exciting current command $I_c$ is applied to the exciter in response to the actual revolution number, thereby preventing over excitation and over loading.

1. An exciter arrangement for generators comprising an internal combustion engine, main and auxiliary generators both being driven by said internal combustion engine, exciter means including static exciter means for receiving the output of said auxiliary generator for supplying an exciting current to said main generator, a detecting circuit for producing an output corresponding to the rotational speed of said internal combustion engine in response to the output of said auxiliary generator, a command circuit for producing a command for said exciting current as a function of said output of said detecting circuit, and a control for controlling the operation of said static exciter means according to said command circuit, wherein said command circuit sets the value of said exciting current at a small value greater than zero when the rotational speed of said engine is less than a predetermined value and at a value which varies substantially in a linear relationship with variation of the rotational speed of said engine when the rotation speed is greater than said predetermined value.

2. An exciter arrangement according to claim 1, wherein said auxiliary generator is arranged to produce an output of a substantially constant voltage irrespective of variation of the rotational speed of said internal combustion engine and of a frequency proportional to the rotational speed of said internal combustion engine.

3. An exciter arrangement according to claim 8, wherein said auxiliary generator is arranged to produce an output of a voltage proportional to the rotational speed of said internal combustion engine.

4. An exciter arrangement according to claim 1, wherein said static exciter means includes thyristor means and the output of said auxiliary generator serves as a power source for said static exciter means.

5. An exciter arrangement according to claim 1, wherein said exciter means includes rotary exciter means coupled to said main generator, said static exciter means providing an output to said rotary exciter means for exciting said rotary exciter means and said rotary exciter means providing an output to said main generator.

6. An exciter arrangement according to claim 5, wherein said static exciter means includes thyristor means and the output of said auxiliary generator serves as a power source for said static exciter means.

7. An exciter arrangement according to claim 2, wherin said static exciter means includes thyristor means and the output of said auxiliary generator serves as a power source for said static exciter means.

8. An exciter arrangement according to claim 3, wherein said static exciter means includes thyristor means and the output of said auxiliary generator serves as a power source for said static exciter means.

9. An exciter arrangement for generators including main and auxiliary generators both being driven by an internal combustion engine, said arrangement comprising exciter means including a rectifier connected between said auxiliary generator and the exciting circuit of said main generator to supply said exciting circuit with an exciting current from said auxiliary generator, the conductivity of said rectifier being controllable; a detecting circuit for producing an output corresponding to the rotational speed of the internal combustion engine in response to the output of said auxiliary generator, and means responsive to the output of said detecting circuit for controlling the conductivity of said rectifier thereby to control the amount of said exciting current and thereby control the output voltage of said main generator, wherein the value of said existing current is set at a small value greater than zero when the rotational speed of said engine is less than a predetermined value and at a value which varies substantially in a linear relationship with variation of the rotational speed of said engine when the rotational speed is greater than said predetermined value.

10. An exciter arrangement according to claim 9, wherein said auxiliary generator is arranged to produce an output of a substantially constant voltage irrespective of variation of the rotational speed of said internal combustion engine and of a frequency proportional to the rotational speed of said internal combustion engine.

11. An exciter arrangement according to claim 9, wherein said auxiliary generator is arranged to produce an output of a voltage proportional to the rotational speed of said internal combustion engine.

12. An exciter arrangement according to claim 9, wherein said exciter means includes rotary exciter means coupled to said main generator, said static exciter means providing an output to said rotary exciter means for exciting said rotary exciter means and said rotary exciter means providing an output to said main generator.

13. An exciter arrangement according to claim 1, wherein said predetermined value of the rotational speed of said engine is substantially equal to the idling speed of said engine.

14. An exciter arrangement according to claim 9, wherein said predetermined value of the rotational speed of said engine is substantially equal to the idling speed of said engine.

15. An exciter arrangement according to claim 1, the rotational speed of the internal combustion engine is controlled to change stepwise from its idling speed to its rated speed.

16. An exciter arrangement according to claim 9, wherein the rotational speed of the internal combustion engine is controlled to change stepwise from its idling speed to its rated speed.

17. An exciter arrangement according to claim 1, wherein said linear relationship is a direct linear relationship.

18. An exciter arrangement according to claim 9, wherein said linear relationship is a direct linear relationship.

* * * * *